United States Patent [19]

Suzuki et al.

[11] 4,362,944

[45] Dec. 7, 1982

[54] RADIOGRAPHIC INTENSIFYING SCREEN

[75] Inventors: Yujiro Suzuki, Odawara; Norio Mirua, Isehara; Keiji Shimiya, Hiratsuka, all of Japan

[73] Assignee: Kasei Optonix Ltd., Tokyo, Japan

[21] Appl. No.: 242,377

[22] Filed: Mar. 10, 1981

Related U.S. Application Data

[63] Continuation of Ser. No. 11,538, Feb. 12, 1979, abandoned.

[51] Int. Cl.$^3$ .......... G01J 1/58

[52] U.S. Cl. .......... 250/483.1; 250/486.1

[58] Field of Search .......... 250/483, 486

[56] References Cited

U.S. PATENT DOCUMENTS

| | | | |
|---|---|---|---|
| 2,113,973 | 4/1938 | Addink et al. | 250/487 |
| 2,150,966 | 3/1939 | Eggert et al. | 250/487 |
| 3,725,704 | 4/1973 | Buchanan et al. | 250/483 |
| 4,012,637 | 3/1977 | Swank | 250/475 |
| 4,028,550 | 6/1977 | Weiss et al. | 250/483 |
| 4,149,083 | 4/1979 | Suys et al. | 250/483 |

*Primary Examiner*—Harold A. Dixon
*Attorney, Agent, or Firm*—Gerald J. Ferguson, Jr.; Joseph J. Baker

[57] ABSTRACT

In an intensifying screen composed of a support, a fluorescent layer disposed on the support and a protective layer disposed on the fluorescent layer, the fluorescent layer is composed of one or more phosphors selected from the group consisting of a terbium activated rare earth oxysulfide phosphor, a divalent europium activated alkali earth metal fluorohalide phosphor and a silver activated sulfide phosphor, and the protective layer is a light absorption layer which absorbs a part of light emitted by the fluorescent layer.

4 Claims, 4 Drawing Figures

RADIOGRAPHIC INTENSIFYING SCREEN

This is a continuation, of application Ser. No. 11,538, filed Feb. 12, 1979.

BACKGROUND OF THE INVENTION

1. Field of the Invention

This invention relates to a radiographic intensifying screen, and more particularly to a radiographic intensifying screen having a colored protective layer.

2. Description of the Prior Art

Radiographic intensifying screens (hereinafter referred to simply as "intensifying screen") are used in face contact with radiographic films to increase the sensitivity of the radiographing system in various kinds of fields such as medical radiography for medical diagnosis and industrial radiography for non-destructive inspection of industrial materials. The intensifying screen is essentially composed of a support and a fluorescent layer formed thereon. The fluorescent layer is composed of a phosphor which emits light of high luminance under excitation of radiation and a resinous binder in which the phosphor is dispersed. The surface of the fluorescent layer is usually covered with a thin transparent protective layer as of polyethylene terephthalate, cellulose acetate, polymethacrylate and nitro cellulose.

Some intensifying screens have a reflective layer or an absorptive layer between the support and the fluorescent layer. Further, some intensifying screens used for nondestructive inspection of industrial materials have a metallic foil between the support and the fluorescent layer.

Recently, it has been strongly desired to decrease the dose of patients in medical radiography by enhancing the sensitivity of the radiographic film-intensifying screen system. Thus, a high sensitivity system employing a high sensitivity intensifying screen has been developed and put into practical use. The high sensitivity intensifying screen contains a phosphor having high X-ray absorption and high X-ray to light conversion efficiency such as terbium activated rare earth oxysulfide phosphor. In the intensifying screen, it is desirable that the sensitivity to radiation or X-ray to light conversion efficiency be high. Beside this, it is also desirable that the photographic quality of the obtained image such as sharpness and granularity be improved.

It has been known in the art to enhance the sharpness of the image in radiography by employing a colored protective layer on the fluorescent layer of an intensifying screen as disclosed in U.S. Pat. No. 4,012,637. In this patent, it is disclosed that the sharpness is enhanced by decreasing the amount of fluorescent light advancing in the direction not perpendicular to the surface of the intensifying screen.

On the other hand, the granularity known to be increased by the statistic fluctuation of X-ray quanta accompanying decrease in dose of incident X-ray used for radiographing is difficult to improve in the high sensitivity system. In the high sensitivity system employing a phosphor having high X-ray to light conversion efficiency, the granularity is markedly increased or degraded although the sensitivity of the intensifying screen is enhanced. Accordingly, particularly in the high sensitivity system employing the intensifying screen containing a phosphor of high X-ray to light conversion efficiency, it is highly desired that the granularity be improved to enhance the quality of the radiographic image obtained.

SUMMARY OF THE INVENTION

The principal object of the present invention is, therefore, to provide an intensifying screen having improved granularity as well as improved X-ray to light conversion efficiency thereby enabling production of a high sensitivity intensifying screen providing high image quality in radiography.

The above object is accomplished, based on a number of investigations and tests conducted by the inventors of this invention, by using a phosphor having higher X-ray to light conversion efficiency than that of the conventional $CaWO_4$ phosphor in the fluorescent layer of an intensifying screen and providing a light absorption layer on the fluorescent layer. The light absorption layer also serves as a protective layer. The light absorption layer absorbs a part of the light emitted by the fluorescent layer, which results in improvement in the granularity. Further, the combination of the light absorption layer with the phosphor having higher X-ray to light conversion efficiency than that of the conventional $CaWO_4$ phosphor is proved to be superior in enhancing the granularity to the combination of the light absorption layer with the conventional $CaWO_4$ phosphor. Thus, in accordance with the present invention, an intensifying screen having high sensitivity and improved granularity is obtained.

The intensifying screen in accordance with the present invention is characterized specifically in that a fluorescent layer and a protective layer are deposited on a support in this order, and the fluorescent layer is composed of a phosphor comprising one or more kinds of phosphors selected from a group consisting of terbium activated rare earth oxysulfide phosphor, divalent europium activated alkali earth metal fluorohalide phosphor, and silver activated sulfide phosphor, and the protective layer is a light absorption layer capable of absorbing a part of the light emitted by the fluorescent layer.

The intensifying screen of this invention having the above structure has a superior granularity as compared with the intensifying screen employing the same phosphor and the same level of sensitivity. Further, the intensifying screen of this invention has a superior sharpness as compared with that employing the same phosphor and the same level of sensitivity. Furthermore, the intensifying screen of this invention has a granularity improved to a greater extent as compared with that employing the conventional $CaWO_4$ phosphor and a light absorption layer, and of course has a higher sensitivity in this case.

Hence, the combination of the particular high sensitivity phosphor and the light absorption layer serving as a protective layer provides a new high performance intensifying screen having high sensitivity, high sharpness and improved granularity at the same time which has not been provided in the prior art.

DETAILED DESCRIPTION OF THE INVENTION

Figure 1:
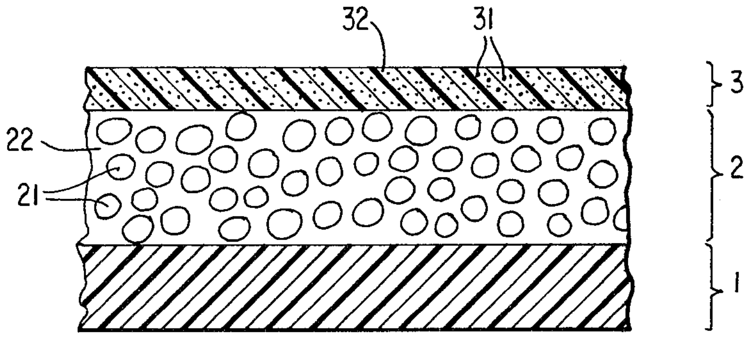
FIGS. 1 to 4 are schematic cross-sectional views of intensifying screens in accordance with embodiments of the present invention.

The intensifying screen in accordance with the present invention is manufactured by the same process as the conventional manufacturing process for producing the conventional intensifying screen except for the step of providing a light absorption layer instead of a transparent protective layer. That is, at first a phosphor and a resinous binder such as nitrocellulose are mixed together at a proper mixing ratio and a proper amount of solvent is added thereto to prepare a coating dispersion of the phosphor having the optimum viscosity. The solution is applied on a support 1 with a roll coater or a knife coater and dried to form on the support 1 a fluorescent layer 2 comprising the phosphor 21 and the resinous binder 22 in which the phosphor 21 is dispersed as shown in FIGS. 1 to 4. Between the support 1 and the fluorescent layer 2, an intermediate layer such as a light reflection layer, light absorption layer or metal layer may be provided. In such a case, the intermediate layer is first applied on the support 1 and then the phosphor solution is applied thereon and dried. Then, a colored light absorption layer 3 serving as a protective layer is applied on the fluorescent layer 2 to obtain the aimed intensifying screen.

Figure 2:
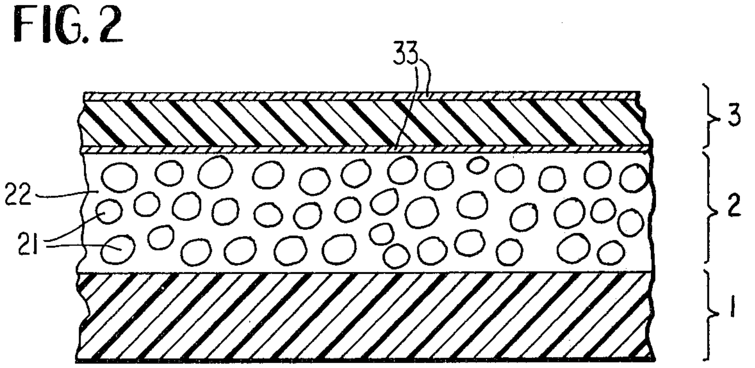
Figure 3:
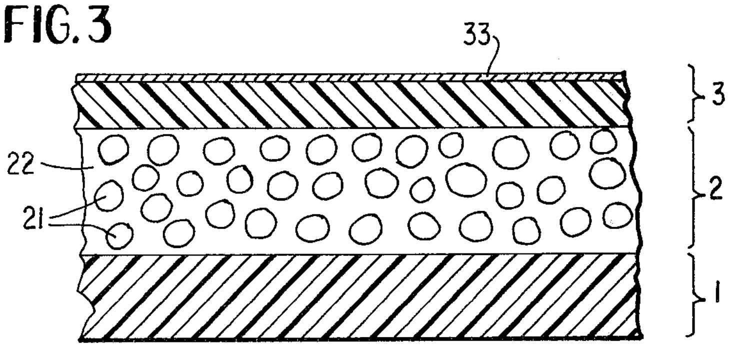
Figure 4:
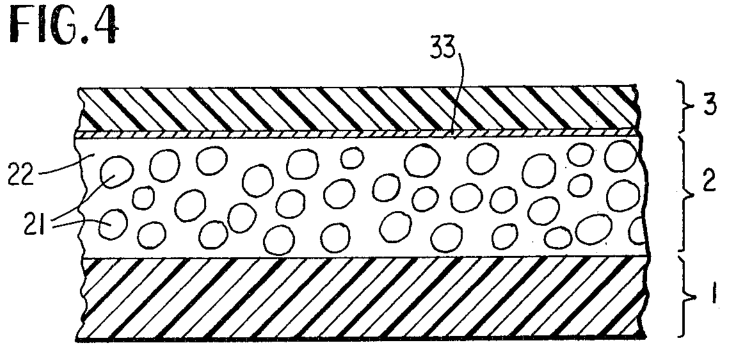

The colored light absorption layer 3 is prepared in accordance with the following process. A proper amount of solvent is added to a resin such as polyvinyl chloride, polyethylene or cellulose acetate to make the viscosity optimum. Then, a dye or pigment is added thereto and the mixture is thoroughly stirred to disperse the dye or pigment in the resin, and the stirred mixture is applied on the fluorescent layer 2 with a roll coater or a knife coater and dried. Thus, as shown in FIG. 1, a light absorbing layer 3 in which a dye or pigment 31 is dispersed in a transparent protective material 32 is applied on the fluorescent layer 2. Alternatively, a thin transparent film as of polyethylene terephthalate which has been colored in advance by mixing a dye or pigment 31 therein as shown in FIG. 1 or dyeing one or both surfaces 33 thereof as shown in FIGS. 2 to 4 is laminated on the surface of the fluorescent layer 2.

In the intensifying screen provided with the light absorption layer 3, the surface of the light absorption layer 3 is scratched and the light transmissivity thereof is changed while the long use thereof due to repeated friction thereof with radiographic films with an intervention of dusts therebetween. Therefore, as shown in FIG. 4, the light absorption layer 3 is desirably made of a transparent protective layer having a light absorbing surface or semi-layer 33 on the back side or the surface faced to the fluorescent layer 2 so that the light absorbing surface or light absorbing layer 33 may not be put into physical contact with the radiographic films.

In the intensifying screen in accordance with the present invention, a high sensitivity phosphor having high X-ray absorptivity and high X-ray to light conversion efficiency is employed. As for such a high sensitivity phosphor can be used a terbium activated rare earth oxysulfide phosphor [$Y_2O_2S$:$T_b$, $Gd_2O_2S$:Tb, $La_2O_2S$:Tb, $(Y,Gd)_2O_2S$:Tb, $(Y,Gd)_2O_2S$:Tb,Tm etc.], a divalent europium activated alkali earth metal fluorohalide phosphor [$B_a$FCl:$Eu^{2+}$, BaFBr:$Eu^{2+}$, BaFCl:$Eu^{2+}$,Tb, BaFBr:$Eu^{2+}$,Tb, $BaF_2$. $BaCl_2$. KCl:$Eu^{2+}$, $BaF_2$. $BaCl_2$. x$BaSO_4$. KCl:$Eu^{2+}$, $(Ba,Mg)F_2$. $BaCl_2$. KCl:$Eu^{2+}$ etc.] and a silver activated sulfide phosphor [ZnS:Ag, (Zn,Cd)S:Ag etc.].

As for the dye or pigment to be used for the light absorption layer can be used the following materials. For blue can be used methylene blue, victoria blue B, induline, disperse fast blue B, ultramarine, cobalt blue, prussian blue and so forth. For green can be used disperse green 3B, malachite green, chrome green, cobalt green, chromium oxide and so forth. For yellow can be used fast light yellow G, auramine G conc., disperse fast yellow G, chrome yellow M, chrome yellow, cadmium yellow, titanium yellow and so forth. For red can be used chrome red G, disperse red R, oil red, red oxide, cadmium sulfoselenide, thioindigo maroon and so forth.

The present invention will be further described in detail with reference to several data of tests of examples thereof shown in comparison with the prior art. Table 1 below shows the granularity resulting from the intensifying screens of this invention in comparison with that of a prior art.

The intensifying screen of the present invention shown in Table 1 uses $Y_2O_2S$:$T_b$ phosphor for the fluorescent layer and chrome yellow M for coloring the protective layer. The prior art example shown in Table 1 uses the same phosphor and a transparent film without a coloring agent. In Table 1, Sample No. 1 is a conventional intensifying screen without the colored light absorbing protective layer and Sample Nos. 2 to 4 are intensifying screens in accordance with the present invention. Further, Sample Nos. 1 to 3 have a light absorbing layer between the support and the fluorescent layer and Sample No. 4 has a light reflecting layer between the support and the fluorescent layer. The granularity of the respective intensifying screens is represented by RMS value where the photographic density is 0.8 and the spatial frequency is 0 to 5 lines/mm, and the sharpness is represented by MTF value where the spatial frequency is 2 lines/mm.

TABLE 1

| Sample No. | Color of Protective Layer | Amount of Applied Phosphor ($mg/cm^2$) | Relative Sensitivity (%) | Granularity (RMS value) | Sharpness (MTF value) |
|---|---|---|---|---|---|
| 1 | None | 40 | 100 | $1.40 \times 10^{-1}$ | 0.45 |
| 2 | Colored | 40 | 65 | $1.15 \times 10^{-1}$ | 0.51 |
| 3 | Colored | 60 | 103 | $1.20 \times 10^{-1}$ | 0.46 |
| 4 | Colored | 40 | 101 | $1.22 \times 10^{-1}$ | 0.45 |

As shown in Table 1, when the protective layer is colored to be made into a light absorption layer, both the granularity and sharpness are enhanced but the sensitivity is lowered because of absorption of the light emitted from the fluorescent layer by the light absorption layer. This is clearly shown when Sample Nos. 1 and 2 are compared in which the amount of the phosphor applied on the support is the same. When the amount of the phosphor is increased to raise the sensitivity as shown in Sample No. 3, the granularity is lowered or degraded as compared with Sample 2 but the degree of degradation is not so high and the granularity is still better than Sample No. 1. On the other hand, the sharpness is lowered as the increase of the amount of phosphor applied. However, the sharpness of Sample No. 3 is slightly better than Sample No. 1. Further, when a light reflecting layer is provided to increase the sensitivity as Sample No. 4, the granularity is lowered than Sample No. 2 like Sample No. 3, the granularity is still much better than Sample No. 1 and the sharpness is not worse than Sample No. 1.

Now another set of data indicating the results of this invention based on the difference between the kinds of phosphor employed will be described in detail with reference to Table 2. Table 2 shows the granularity resulting from the intensifying screens of this invention in comparison with that of a prior art. The intensifying screens of this invention shown in Table 2 uses $Y_2O_2S$:Tb phosphor, BaFCl:$Eu^{2+}$ phosphor and ZnS:Ag phosphor having high X-ray to light conversion efficiency. The phosphor used in the prior art in Table 2 is $CaWO_4$ phoshphor. The prior art intensifying screen has only a transparent protective layer and the intensifying screen of this invention has a colored light absorption layer provided with a surface colored with chrome yellow. There are also shown an intensifying screen using the $CaWO_4$ phosphor provided with a colored light absorption layer and intensifying screens using the high sensitivity phosphor provided with a non-colored transparent protective layer. In other words, in Table 2 there are shown intensifying screens for every phosphor with and without the colored light absorption layer for enabling the comparison between the intensifying screens with and without the light absorption layer for the same phosphor. The sensitivity of the intensifying screen with the light absorption layer is of course lower than that of the intensifying screen without the light absorption layer. In Table 2, the sensitivity with the light absorption layer is set to be 65% of that without the light absorption layer. In Table 2, the sensitivity represented by a relative value only applies to the same phosphor. In other words, the relative value of the sensitivity has nothing to do between the intensifying screens using different phosphors. The granularity and the sharpness are represented by the same value as used in Table 1.

sifying screen in accordance with the present invention is advantageous in that the granularity is improved to a greater extent by the light absorption layer than the conventional intensifying screen employing $CaWO_4$ phosphor, and accordingly the granularity of the intensifying screen of this invention is as good as that of the conventional intensifying screen employing $CaWO_4$ having lower sensitivity.

In case that the fluorescent layer itself is colored without coloring the protective layer, the granularity is little improved though sharpness is markedly enhanced. This seems to be because when the fluorescent layer itself is colored the light emitted by the phosphor on the support side is much more attenuated than the light emitted by the phosphor on the protective layer side, whereas when the protective layer is colored to absorb light the light emitted by the phosphor at any position is attenuated to the same extent.

The light absorption layer should be colored to absorb light to a desirable degree. If the color is too light or the degree of light absorption is too small, the degree of improvement in granularity and sharpness is small though the sensitivity of the intensifying screen is not so lowered. To the contrary, if the color is too thick or the degree of the light absorption is too large, the degree of improvement in granularity and sharpness becomes large but the sensitivity of the intensifying screen is too much lowered. In view of these conditions, the degree of light absorption is preferred to be such that the photographic sensitivity of the intensifying screen with the colored light absorption layer is within the range of 90% to 30% of that of the intensifying screen with a non-colored transparent protective layer. The sensitivity of the intensifying screen with the colored light absorption layer is prevented from being lowered by

TABLE 2

| Used Phosphor | Color of Protective Layer | Amount of Applied Phosphor ($mg/cm^2$) | Relative Sensitivity (%) | Granularity (RMS value) | Sharpness (MTF value) |
|---|---|---|---|---|---|
| $CaWO_4$ | None | 40 | 100 | $1.10 \times 10^{-1}$ | 0.45 |
| $CaWO_4$ | Colored | 40 | 65 | $1.05 \times 10^{-1}$ | 0.50 |
| $Y_2O_2S$:Tb | None | 40 | 100 | $1.40 \times 10^{-1}$ | 0.45 |
| $Y_2O_2S$:Tb | Colored | 40 | 65 | $1.15 \times 10^{-1}$ | 0.51 |
| BaFCl:$Eu^{2+}$ | None | 40 | 100 | $1.30 \times 10^{-1}$ | 0.45 |
| BaFCl:$Eu^{2+}$ | Colored | 40 | 65 | $1.10 \times 10^{-1}$ | 0.52 |
| ZnS:Ag | None | 40 | 100 | $1.55 \times 10^{-1}$ | 0.40 |
| ZnS:Ag | Colored | 40 | 65 | $1.13 \times 10^{-1}$ | 0.45 |

As shown in Table 2, in case of the intensifying screen using $CaWO_4$ phosphor the granularity is not or little improved even if a colored light absorption layer is provided. On the other hand in case of the intensifying screen using the high sensitivity phosphor like $Y_2O_2S$:Tb phosphor, BaFCl:$Eu^{2+}$ phosphor and ZnS:Ag phosphor, the granularity is much improved by employing the colored light absorption layer though the sensitivity is somewhat lowered. Hence, it is clarified that the combination of the high sensitivity phosphor and the colored light absorption layer serving also as a protective layer results in an intensifying screen having high sensitivity and highly improved granularity which could not be obtained in the prior art.

As shown by the data of Tables 1 and 2 and as clear from the description of several examples made hereinafter, the intensifying screen in accordance with the present invention has better granularity than the conventional intensifying screen which uses the same phosphor and has the same level of sensitivity. Further, the intenincreasing the amount of phosphor applied on the support as the fluorescent layer and providing a light reflection layer between the support and the fluorescent layer. Further, when the amount of the phosphor applied on the support as the fluorescent layer is increased or the light reflection layer is provided, the sharpness of the image obtained with the intensifying screen is lowered. In such a case, in order to prevent the lowering of the sharpness, it is effective to make the distribution of phosphor particles of different size in the fluorescent layer in such a manner that the size of the phosphor particles is decreased from the colored protective layer side to the support side.

As mentioned above, it accordance with the present invention the granularity of an intensifying screen particularly of high sensitivity is much improved, which is very significant in practical industrial use.

Now the present invention will be described in detail with reference to several examples thereof.

EXAMPLE 1

8 parts by weight of $Y_2O_2S$:Tb having a mean grain size of 7μ and 1 part by weight of nitrocellulose are mixed together by use of a solvent (mixture of acetone, ethylacetate and butyl acetate mixed in the ratio of 1:1:8) to prepare a coating dispersion having a viscosity of 50 centistokes. The coating dispersion was uniformly applied with a knife coater in an amount of 60 mg/cm$^2$ on a support of polyethylene terephthalate having a carbon black light absorbing layer having a thickness of 250μ, and then was dried at the temperature of 50° C. to form a fluorescent layer on the support. Thereafter, a mixture of nitrocellulose and chrome yellow M (made by Tokyo Kasei Kogyo K.K.) was applied on the fluorescent layer and dried at 50° C. to form a colored light absorption protective layer thereon having a thickness of about 10μ and having a transmissivity of about 60% for the main peak of emission of $Y_2O_2S$:Tb, i.e. 420 nm.

The intensifying screen thus prepared was used in combination with a radiographic film of orthochromatic type. Consequently, as shown in Table 3 on the first and second lines thereof, the granularity was improved from $1.40\times10^{-1}$ to $1.20\times10^{-1}$ as compared with an intensifying screen having a transparent non-colored protective layer on a fluorescent layer composed of the same phosphor.

EXAMPLE 2

A coating dispersion to be applied on a support was prepared in the same manner as employed in Example 1 using ZnS:Ag phosphor instead of $Y_2O_2S$:Tb phosphor. The mean grain size of the used phosphor was 8μ. The coating dispersion was uniformly applied with a knife coater in an amount of 55 mg/cm$^2$ on a support of polyethylene terephthalate having a carbon black light absorbing layer having a thickness of 250μ, and was dried at the temperature of 50° C. to form a fluorescent layer thereon. Thereafter, a mixture of nitrocellulose and methylene blue (made by Merck) was applied on the fluorescent layer and dried at 50° C. to form a colored light absorption protective layer thereon having a thickness of about 10μ and having a transmissivity of about 65% for the main peak of emission of ZnS:Ag, i.e. 420 nm.

The intensifying screen thus prepared was used in combination with a radiographic film of regular type. As a result, as shown in Table 3 on the third and fourth lines thereof, the granularity and sharpness were both improved as compared with an intensifying screen having a transparent non-colored protective layer on a fluorescent layer composed of the same phosphor.

EXAMPLE 3

A coating dispersion to be applied on a support was prepared in the same manner as employed in Example 1 using BaFCl:$Eu_{2+}$ phosphor instead of $Y_2O_2S$:Tb phosphor. The mean grain size of the used phosphor was 6μ. The coating dispersion was uniformly applied with a knife coater in an amount of 60 mg/cm$^2$ on a support of polyethylene terephthalate having a carbon black light absorbing layer having a thickness of 250μ, and was dried at the temperature of 50° C. to form a fluorescent layer thereon. Thereafter, a mixture of cellulose acetate and cobalt blue (made by Harshaw Chemical #7546) was applied on the fluorescent layer and dried at 50° C. to form a colored light absorption protective layer thereon having a thickness of about 5μ and having a transmissivity of about 60% for the main peak of emission of BaFCl:$Eu^{2+}$, i.e. 390 nm.

The intensifying screen thus prepared was used in combination with a radiographic film of regular type. As a result, as shown in Table 3 on the fifth and sixth lines, the granularity and sharpness were both improved as compared with an intensifying screen having a transparent non-colored protective layer on a fluorescent layer composed of the same phosphor.

EXAMPLE 4

A coating dispersion to be applied on a support was prepared in the same manner as employed in Example 1 using $Gd_2O_2S$:Tb phosphor instead of $Y_2O_2S$:Tb phosphor. The mean grain size of the used phosphor was 6μ. The coating dispersion was uniformly applied with a knife coater in an amount of 40 mg/cm$^2$ on a support of polyethylene terephthalate having a titanium oxide light reflecting layer having a thickness of 250 μ, and was dried at the temperature of 50° C. to form a fluorescent layer thereon. Thereafter, a film of polyethylene terephthalate having a thickness of about 10μ was dyed on both surfaces with Kayaset yellow 2G (made by Nippon Kayaku K.K.) was adhered to the surface of the fluorescent layer to form a colored light absorption protective layer thereon having a transmissivity of about 65% for the main peak of emission of $Gd_2O_2S$:Tb, i.e. 545 nm.

The intensifying screen thus prepared was used in combination with a radiographic film of orthochromatic type. As a result, as shown in Table 3 on the seventh and eighth lines thereof, the granularity and sharpness were both improved as compared with an intensifying screen having a transparent non-colored protective layer on a fluorescent layer composed of the same phosphor and using a carbon black light absorbing layer instead of the titanium oxide light reflecting layer used in the above example.

EXAMPLE 5

Three kinds of $Gd_2O_2S$:Tb phosphor having the mean grain size of 1.5μ, 3μ and 6μ respectively were used to prepare three kinds of coating dispersion in the same manner as employed in Example 1. These three kinds of coating dispersion were applied on a support of polyethylene terephthalate having a carbon black light absorbing layer having a thickness of about 250 μ in the order from the smaller grain size phosphor in the amount of 10 mg/cm$^2$, 20 mg/cm$^2$ and 15 mg/cm$^2$ respectively for the grain size of 1.5μ, 3μ and 6μ by use of a knife coater. The application of these three kinds of coating dispersion was made by repeating application with a knife coater and drying for every kind of coating dispersion. On the fluorescent layer thus prepared was adhered a film of polyethylene terephthalate having a thickness of about 10μ which was dyed only on the fluorescent layer side surface thereof with Kayaset yellow (made by Nippon Kayaku K.K.) for form a colored light absorption protective layer thereon having a transmissivity of about 65% for the main peak of emission of $Gd_2O_2S$:Tb, i.e. 545 nm.

The intensifying screen thus prepared was used in combination with a radiographic film of orthochromatic type. As a result, as shown in Table 3 on the ninth and tenth lines thereof, the granularity and sharpness were both improved as compared with an intensifying screen having a transparent non-colored protective layer on a fluorescent layer composed of the same phosphor in which only one kind phosphor having a mean grain size of 6μ was applied in the amount of 40 mg/cm$^2$.

TABLE 3

| Example No. Kind of Int. Screen | Amount of Phosphor (mg/cm$^2$) | Relative Sensitivity (%) | Granularity (RMS value) | Sharpness (MTF value) |
|---|---|---|---|---|
| Prior Art | 40 | 100 | $1.40 \times 10^{-1}$ | 0.45 |
| Example 1 | 60 | 103 | $1.20 \times 10^{-1}$ | 0.45 |
| Prior Art | 40 | 100 | $1.55 \times 10^{-1}$ | 0.40 |
| Example 2 | 55 | 100 | $1.25 \times 10^{-1}$ | 0.41 |
| Prior Art | 40 | 100 | $1.30 \times 10^{-1}$ | 0.45 |
| Example 3 | 60 | 99 | $1.15 \times 10^{-1}$ | 0.47 |
| Prior Art | 40 | 100 | $1.15 \times 10^{-1}$ | 0.50 |
| Example 4 | 40 | 105 | $1.05 \times 10^{-1}$ | 0.53 |
| Prior Art | 40 | 100 | $1.15 \times 10^{-1}$ | 0.50 |
| Example 5 | 45 | 99 | $1.03 \times 10^{-1}$ | 0.56 |

Table 3 shown above clearly indicates that in accordance with the present invention the granularity is much improved with the same or almost the same sensitivity. In Examples 2 to 5, both the granularity and sharpness are improved. As will be seen when Table 3 and Table 2 are compared, the examples shown in Table 3 are characterized in that the sensitivity of the intensifying screen is made all the same or almost the same so that the results may be compared with each other with the same sensitivity. Thus, from Table 3 it is clearly seen that in accordance with the present invention it is possible to obtain an intensifying screen having a high sensitivity and highly improved granularity. In Examples 2 to 5, sharpness is also improved.

We claim:

1. A radiographic intensifying screen composed of a support, a fluorescent layer and a protective layer disposed in this order wherein said protective layer has a fluorescent layer side surface adjacent the fluorescent layer and an outer surface oppositely disposed from the fluorescent layer side surface and said fluorescent layer comprises one or more phosphors selected from the group consisting of a terbium activated rare earth oxysulfide phosphor, a divalent europium activated alkali earth metal fluorohalide phosphor and a silver activated sulfide phosphor, wherein light absorption material has been coated onto or dyed into the portion of the protective layer adjacent the fluorescent layer side surface thereof where said light absorption material absorbs a part of the light emitted by said fluorescent layer and where the portion of the protective layer adjacent said outer surface thereof is free of said light absorption material.

2. A radiographic intensifying screen as defined in claim 1 wherein said protective layer is a colored layer which comprises a transparent film and said light absorption material comprises a dye coated only on said fluorescent layer side surface.

3. A radiographic intensifying screen as defined in claim 2 wherein said transparent film is made of polyethylene terephthalate.

4. A radiographic intensifying screen as defined in claim 1 wherein the photographic sensitivity of the intensifying screen is within the range of 90% to 30% of that.

* * * * *

UNITED STATES PATENT AND TRADEMARK OFFICE
CERTIFICATE OF CORRECTION

PATENT NO. : 4,362,944

DATED : December 7, 1982

INVENTOR(S) : YUJIRO SUZUKI, NORIO MIURA and KEJI SHIMIYA

It is certified that error appears in the above-identified patent and that said Letters Patent are hereby corrected as shown below:

IN THE HEADING OF THE PATENT:

Change the inventor's name from "Norio Mirua" to --Norio Miura--.

Signed and Sealed this

*Eighth* Day of *March 1983*

[SEAL]

*Attest:*

GERALD J. MOSSINGHOFF

*Attesting Officer* *Commissioner of Patents and Trademarks*

UNITED STATES PATENT AND TRADEMARK OFFICE
CERTIFICATE OF CORRECTION

PATENT NO. : 4,362,944

DATED : December 7, 1982

INVENTOR(S) : Yujiro Suzuki, Norio Miura and Keiji Shimiya

It is certified that error appears in the above-identified patent and that said Letters Patent is hereby corrected as shown below:

Claim 4, last line, after "90% to 30% of that", insert --of an intensifying screen in which said protective layer is a transparent non-colored film.--

Signed and Sealed this

*Thirty-first* Day of *December 1985*

[SEAL]

*Attest:*

DONALD J. QUIGG

*Attesting Officer* *Commissioner of Patents and Trademarks*